Figure 1:
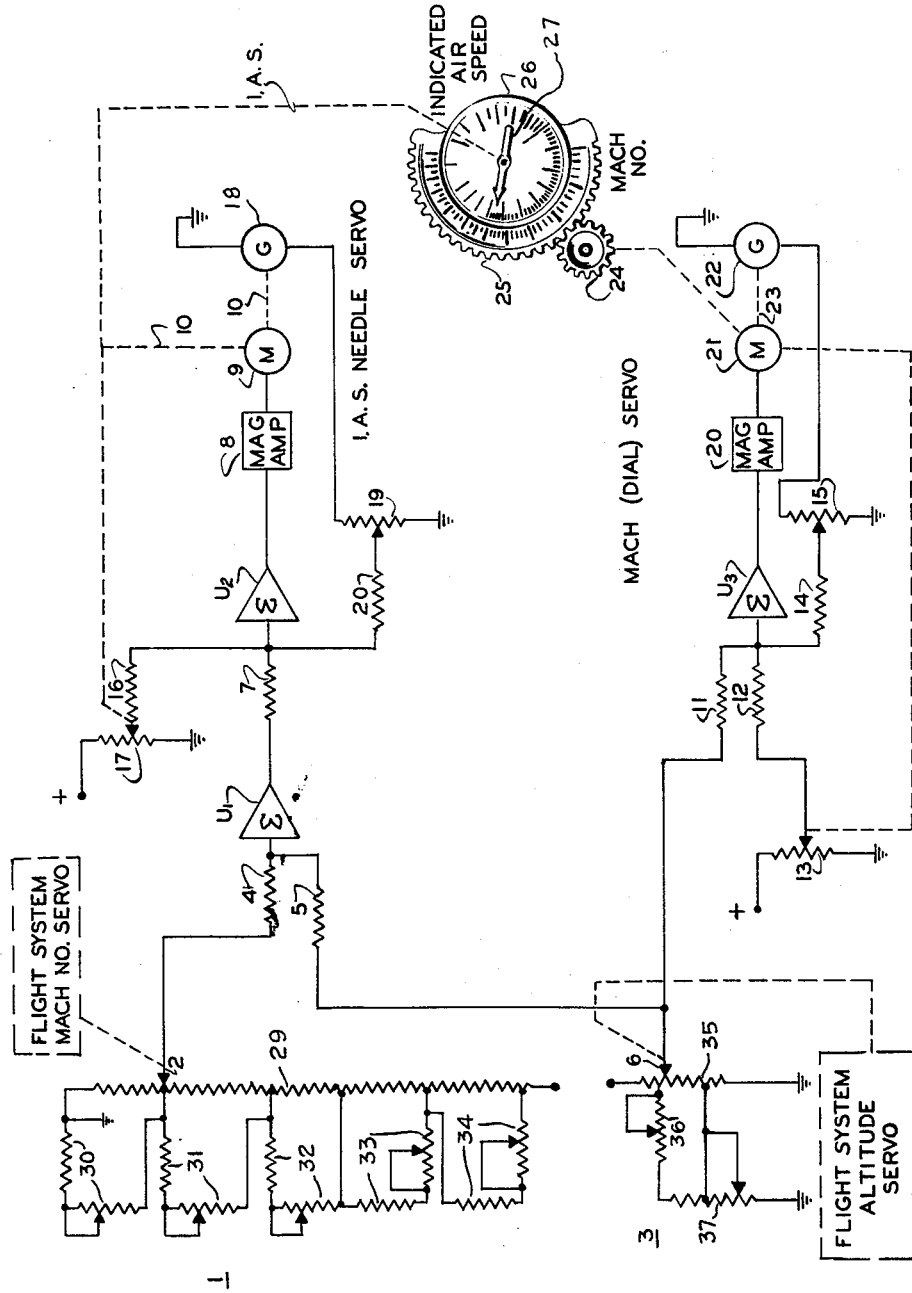

May 31, 1960     J. M. HUNT     2,938,280
SIMULATED AIRCRAFT SPEED INDICATING SYSTEMS
Filed Aug. 15, 1956     3 Sheets-Sheet 1

JOHN M. HUNT
INVENTOR

BY *Darby & Darby*
ATTORNEY

May 31, 1960  J. M. HUNT  2,938,280
SIMULATED AIRCRAFT SPEED INDICATING SYSTEMS
Filed Aug. 15, 1956  3 Sheets-Sheet 3
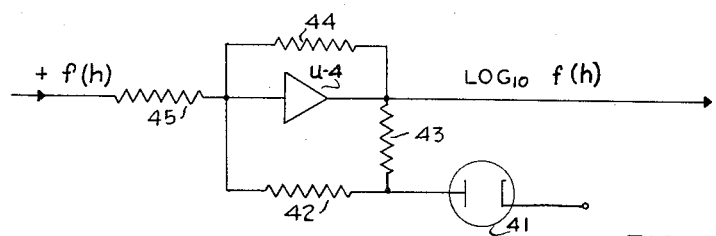
FIG. 4
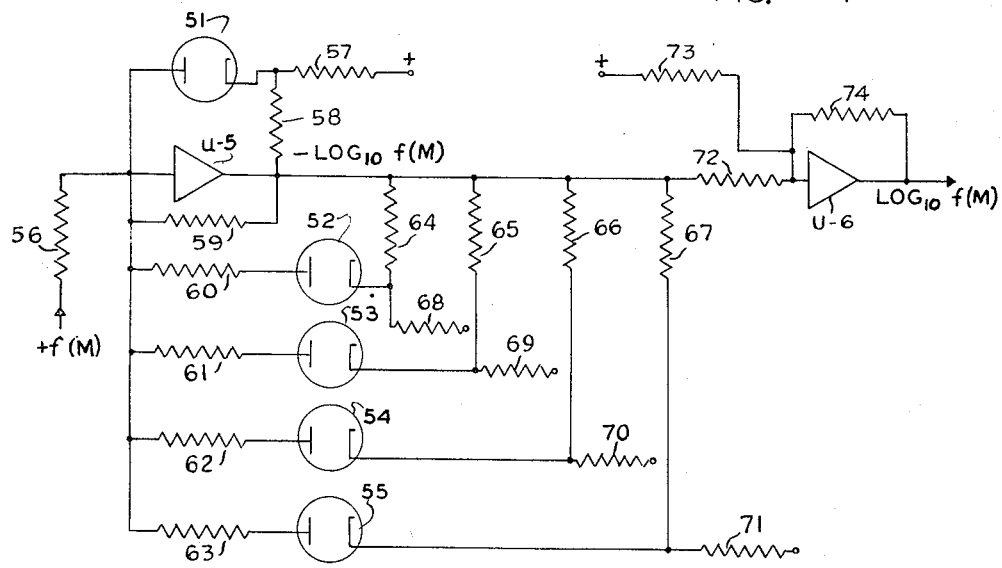
FIG. 5
FIG. 6
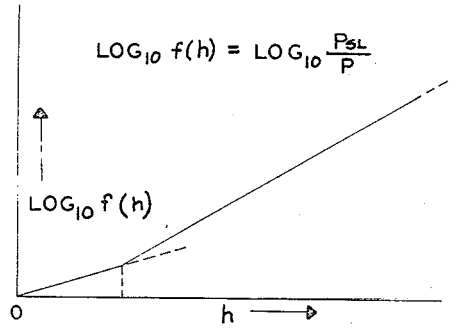
$LOG_{10} f(h) = LOG_{10} \frac{P_{SL}}{P}$
FIG. 7
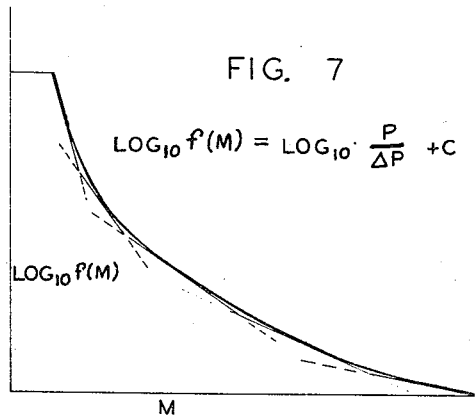
$LOG_{10} f(M) = LOG_{10} \frac{P}{\Delta P} + C$
JOHN M. HUNT
INVENTOR
BY *Darby & Darby*
ATTORNEY United States Patent Office 2,938,280
Patented May 31, 1960

2,938,280

SIMULATED AIRCRAFT SPEED INDICATING SYSTEMS

John M. Hunt, Binghamton, N.Y., assignor to General Precision, Inc., a corporation of Delaware Filed Aug. 15, 1956, Ser. No. 604,265

3 Claims. (Cl. 35—12)

This invention relates to grounded aircraft training apparatus in which the operation of controls simulating those of an actual aircraft causes indications observable by a student operator who is presented with an environment wherein he may be given realistic ground training as a precursor to the control of an actual aircraft. More particularly, it relates to apparatus for accurately simulating indicated air speed in a grounded aircraft trainer.

It will be appreciated that the value of such training is measured largely by the realism of the environment established by the grounded training apparatus, and by the accuracy with which actual flight conditions are simulated. For example, with the advent of high speed jet flight it is important that the "Indicated Airspeed Meter" readings be accurately simulated. Moreover, the trend toward high altitude flights has amplified the need of accurate simulation of the "Indicated Airspeed Meter" readings. Prior to the present invention in order that realism and accuracy could be achieved the apparatus was required to be elaborate and costly, necessitating a large number of computing systems and servo mechanisms whose function is the accurate solution of the equations of flight involving considerations of the aircraft's motion in its environment. In prior art trainers, many of these equations are generalized or simplified in order to minimize, without undue sacrifice of realism and accuracy, the amount of computer equipment needed.

It is well known to those skilled in the art that definite relations exist between indicated airspeed, equivalent air speed and Mach number. It has, therefore, under the systems of the prior art, been a practice to simplify the problem of a simulated instrument presentation of simulated air speed by computing "equivalent air speed" and to use this quantity to position the air speed indicator needle, or, alternatively, to compute simulated indicated air speed as a simple function of Mach number, multiplied by a simple function of altitude.

One such problem associated with the prior art consists in the computation of simulated "indicated air speed" from considerations of altitude and Mach number. The accurate calculation of this quantity using straightforward relationships entails a considerable amount of equipment in an analog computer, and the tendency has been to simplify the problem of omission of compressibility effects. It will be apparent to those skilled in the art that the computation then resolves itself into the relatively simple expedient of obtaining the indicated air speed as a simple function of altitude multiplied by Mach number. While these expedients were justified in the interests of simplicity of computation and economy of computing apparatus, they give rise to rapidly increasing errors as the speed of flight and altitude increase, owing to an increasingly appreciable compressibility effect which manifests itself at the higher subsonic Mach numbers, through the transonic range into supersonic flight. This compressibility error is a function of altitude and Mach number.

Using other known methods and apparatus of the prior art the accurate computation of a true instrument presentation of indicated air speed is perfectly feasible, but would be unduly expensive in terms of the very considerable amount of equipment which would be required in an analog computer. Moreover, the prevalent use of a combined Mach number and indicated air speed instrument having a non-linear air speed scale adds further complexity in the need for deriving a suitable non-linear shaft output to position the I.A.S. needle.

The invention provides a simplified method and means whereby indicated air speed may be accurately represented by relatively simple computing apparatus without recourse to the expedient of error producing generalizations and simplifications.

It is accordingly an object of the present invention to present a simplified system for obtaining a high degree of accuracy a realistic simulated presentation of indicated air speed.

It is another object of the invention to obtain an accurate presentation of simulated indicated air speed in a simple and economical manner.

It is a further object of the invention to obtain easily a presentation of simulated indicated air speed without recourse to inaccurate generalization and simplifications.

It is a still further object of the invention to obtain a directly useful non-linear shaft output representative of simulated "Indicated Air Speed" without the use of additional computing apparatus.

It is another object of the present invention to obtain a presentation of simulated indicated air speed which is adaptable to a combination "Indicated Air Speed" and Mach number indicator.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

Figure 3:
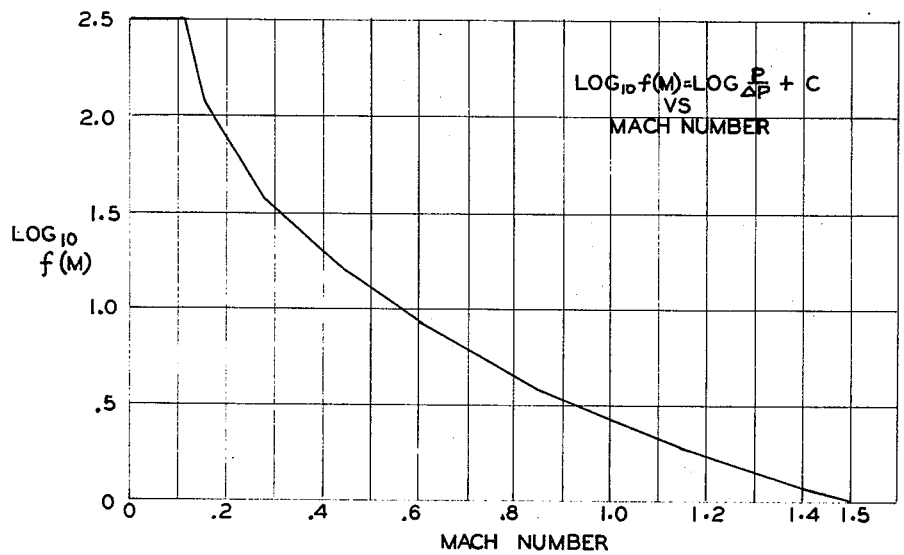
Figure 2:
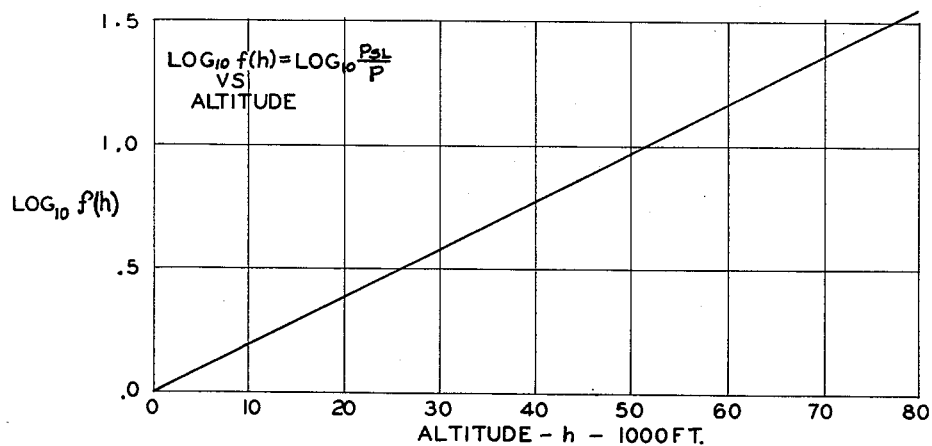

For a fuller understanding of the nature and objects of the invention, reference should be had to the following detailed description taken in connection with the accompanying drawing, in which:

Fig. 1 is an electrical schematic of a preferred embodiment of the present invention, Fig. 2 is a graphical representation of a complex logarithmic function of altitude useful in understanding the present invention, Fig. 3 is a graphical representation of a complex logarithmic function of Mach number useful in understanding the present invention, Fig. 4 is an electrical schematic of diode function generators being used to generate the function of Fig. 2.

Fig. 5 is an electrical schematic of diode function generators being used to generate the function of Fig. 3, Fig. 6 is a graphical representation similar to Fig. 2 which is useful to explain the operation of the electrical circuitry of Fig. 4, and Fig. 7 is a graphical representation similar to Fig. 3 which is useful to explain the operation of the electrical circuitry of Fig. 5.

In real aircraft, "Indicated Air Speed" is by definition the reading of a differential pressure airspeed indicator calibrated in accordance with the accepted standard adiabatic formula to indicate true air speed for standard sea level conditions only, uncorrected for instrument and installation errors. The "Indicated Air Speed" indication is important in real aircraft as the aircraft's stalling speed is represented by a constant indicated air speed which is independent of altitude.

In real aircraft there is no direct indication of true airspeed in that there is no absolute need for the pilot to know this information, and it is a complex function of Indicated Air Speed. However, in higher speed aircraft which travel near or over the speed of sound, a Mach number indication is also made available to the pilot in order that he can avoid exceeding the physical capabilities of the aircraft. "Indicated Air Speed" and Mach number instruments vary in that some are linear in scale, while others are non-linear using several scales over several ranges. Still others are logarithmic in scale. As will be apparent in the description below, the use of a logarithmic scale has inherent advantages relative to a combination "Indicated Air Speed" and Mach number indicator. The present invention readily lends itself to the simulation of both "Indicated Air Speed" and Mach number on a combination indicator. However, it should be noted that the disclosed means of obtaining a simulation of "Indicated Air Speed" which includes the effect of compressibility is adaptable to any scale by certain changes in circuitry as taught herein.

As stated above, it is well known in the prior art that an accurate representation of "Indicated Air Speed" varies as a complex function of altitude and Mach number:

$$f(I.A.S.) = f(h) \times f(M) \quad (1)$$

It is also known that the following is a complex equation representing "Indicated Air Speed" which includes the effect of compressibility:

$$\log_{10} f(I.S.A._m.) = \log_{10} \frac{P_{sl}}{P} + \log_{10} \frac{P}{\Delta P} + (c) \quad (2)$$

where

I.A.S. represents indicated air speed,
$P_{sl}$ represents the free stream static pressure at sea level,
$P$ represents the free stream pressure at altitude $h$,
$\Delta P$ represents the pressure differential between static and pitot head pressure,
$c$ is a constant representing position and installation errors of the I.A.S. indicator.

Equation 2 represents a more complex and accurate computation for "Indicated Air Speed" than has been heretofore solved in flight simulators. While Equation 2 is useful in the design of "Indicated Air Speed" indicators in real aircraft, its terms are not suitable for solution in standard flight simulators where the terms altitude ($h$) and Mach number ($M$) are standard computer quantities. Therefore it appears desirable to obtain Equation 2 in terms of Equation 1. If the $\log_{10}$ is taken of both sides of Equation 1 it appears as Equation 3:

$$\log_{10} f(I.A.S.) = \log_{10} f(h) + \log_{10} f(M) \quad (3)$$

Since the left hand side of Equations 2 and 3 are the same, the right sides are set equal to each other and represented as Equation 4:

$$\log_{10} f(I.A.S._m.) = \log_{10} f(h) + \log_{10} f(M)$$
$$= \log_{10} \frac{P_{sl}}{P} + \log_{10} \frac{P}{\Delta P} + C \quad (4)$$

On examination of the nature of the terms of Equation 4 it becomes apparent that $$\log_{10} f(h) = \log_{10} \frac{P_{sl}}{P} \quad (5)$$

$$\log_{10} f(M) = \log_{10} \frac{P}{\Delta P} + C \quad (6)$$

Equation 4 represents a complex and accurate equation including compressibility for "Indicated Air Speed" in terms of altitude ($h$) and Mach number ($M$). Both altitude ($h$) and Mach number ($M$) are standard computer quantities flight simulators of high speed aircraft. In order to solve Equation 4 in flight simulators in accordance with the present invention function generating means need to be provided to solve Equations 5 and 6 with inputs of altitude and Mach number respectively. Figs. 2 and 3 represent a plot of the functions of Equations 5 and 6 respectively. Fig. 2 and Equation 5 are applicable to any aircraft, while Fig. 3 and Equation 6 will vary with particular simulated aircraft, depending on the particular indicator installation, because the constant C varies.

The functions of Equations 5 and 6 as plotted in Figs. 2 and 3 can be solved electrically by several means well known to the electrical arts. For example, Fig. 1 illustrates the use of functional potentiometers shaped to correspond to functions plotted in Figs. 2 and 3, while Figs. 4 and 5 illustrate the use of diode function generators for the same purpose. It should be noted, however, that many other function generators are available for use by those skilled in the electrical arts.

Fig. 1 shows a schematic diagram of the computing system of the present invention together with such portions of a flight computing system as are useful in understanding the operation of the invention. Therein, the complex and accurate Equation 4 set forth above is solved by deriving the quantities $\log_{10} f(h)$ and $\log_{10} f(M)$ from altitude ($h$) and Mach number ($M$) respectively, and summing them to obtain a quantity representing the $\log_{10} f(I.A.S.)$. Further, the quantity representing the $\log_{10} f(I.A.S.)$ is used to position the shaft of an indicator.

Shaped potentiometer 1 may be designed as a logarithmic function to solve Equation 6 providing a quantity commensurate with the logarithm of a function of Mach number. Wiper 2 may be positioned according to Mach number derived from a Mach number servo of a flight simulator computer such as is disclosed, for example, in copending application Serial Number 477,741, filed December 27, 1954, now Patent No. 2,925,667, entitled "Aircraft Trainer Apparatus" by Laurence E. Fogarty and assigned to the same assignee as the present invention. Shaped potentiometer 1 may comprise resistor 29 tapped at desired points with a plurality of adjustment networks (padding networks) comprising adjustable resistors 30, 31, 32, 33 and 34 such that each tap voltage may be set to an appropriate value according to the desired function being generated. The design, operation and performance of tapped potentiometers as function generators is described in "Electronic Analog Computers" by Korn and Korn, Second Edition, McGraw-Hill Book Company, beginning on page 321. The voltage appearing at wiper 2 as a logarithmic function of Mach number is applied via a summing resistor 4 to the input of summing amplifier $U_1$. Shaped potentiometer 3 may be designed to derive the logarithmic function of Equation 5 to provide a quantity commensurate with the logarithm of a function of altitude. Shaped potentiometer 3 may comprise resistor 35 cooperating with wire 6 where resistor 35 is tapped at desired points by a plurality of adjustment networks comprising adjustable resistors 36 and 37 such that each tap voltage is set to an appropriate value according to the desired function being generated. Wiper 6 may be positioned according to altitude derived from an altitude servo of any conventional flight simulator computer such as disclosed, for example, in copending application Serial Number 477,741 mentioned above. The voltage appearing at wiper 6 as a logarithmic function of altitude is applied via a summing resistor 5 to the input of summing amplifier $U_1$. The output voltage from summing amplifier $U_1$ is representative of the solution of Equation 4 above and is commensurate with the $\log_{10}$ of a function of Indicated Air Speed. This voltage is utilized to drive an "Indicated Air Speed" indicator by means of a servo loop.

The output voltage from summing amplifier $U_1$ is applied to the input terminal of a servo amplifier $U_2$ via summing resistor 7. The output voltage from servo amplifier $U_2$ is applied to a conventional servo motor 9 through a conventional magnetic amplifier 8 which positions a shaft 10 in accordance with the $\log_{10}$ of the "Indicated Air Speed." Shaft 10 drives needle 27 relative to an indicated air speed scale. Motor 9 also positions a wiper on a follow-up potentiometer 17 which applies a follow-up voltage to the input of summing amplifier $U_2$ to zero out the input voltage. Generator 18 mounted on a shaft 10 provides a velocity damping voltage at the input to summing amplifier $U_2$ through resistors 19 and 20 in a conventional manner. In the specific disclosed embodiment follow-up potentiometer 17 is linear because the air speed indicator is logarithmic in scaling. However, it should be pointed out that if the calibration of the air speed indicator were linear, the follow-up potentiometer 17 could well be made logarithmic in order that shaft 10 driving the Indicated Air Speed indicator be positioned as a linear function of the "Indicated Air Speed" as determined by a solution of Equation 4 above. If the indicator scale 26 is neither logarithmic nor linear but any other desired scaling, it should be apparent that the follow-up potentiometer 17 may be shaped so that the shaft 10 and the "Indicated Air Speed" indicator may be positioned according to that desired scale and commensurate with a solution of Equation 4. In this way an accurate "Indicated Air Speed" can be obtained in flight simulators which simulate aircraft operating at speeds where compressibility is of important significance regardless of the scale of presentation.

In high speed aircraft in addition to the requirement for an accurate representation of "Indicated Air Speed," there is a need for providing the pilot with a Mach number indication in order that he may know his speed with reference to the speed of sound and not exceed the physical capabilities of his aircraft. In many high speed aircraft the Mach number indicator is combined with the "Indicated Air Speed" indicator for convenience of presentation and computation. Equation 2 above has already been mentioned as a complex equation for "Indicated Air Speed" which is sometimes used in the design of air speed indicators in real aircraft. Aircraft instrument manufacturers having used an equation represented by $$\log_{10} f(\text{I.A.S.}) = \log_{10} \frac{P_s l}{P} + \log_{10} \frac{P}{\Delta P} + C \quad (2)$$

for design, have also recognized that the component $$\log_{10} \frac{P}{\Delta P} + C$$

can be represented by a function of Mach number such as set forth in Equation 6. By substituting according to Equation 6, Equation 2 becomes:

$$\log_{10} f(\text{I.A.S.}) = \log_{10} \frac{P_s l}{P} + \log_{10} f(M) \quad (7)$$

Transposing Equation 7 for a function of Mach number, it becomes $$\log_{10} f(M) = \log_{10} f(\text{I.A.S.}) - \log_{10} \frac{P_s l}{P} \quad (8)$$

Inasmuch as Equation 8 is logarithmic it follows that by using logarithmic scales, that the indicated air speed needle may serve two functions. The first function is to represent "Indicated Air Speed" on a logarithmic Air Speed dial. The second function is to represent Mach number on a logarithmic Mach number dial itself positioned in accordance with $$\log_{10} \frac{P_s l}{P}$$

The action of the movable needle relative to the movable dial is that of a logarithmic slide rule, subtracting logarithms to obtain an indication of Mach number.

While the theory of the preceding paragraph was applicable to real aircraft, it is more convenient in dealing with simulators to use the relation $\log_{10} f(h)$ rather than $$\log_{10} \frac{P_s l}{P}$$

This is possible because as indicated above in Equation 5

$$\log_{10} f(h) = \log_{10} \frac{P_s l}{P}$$

As already discussed above relative to Fig. 1, shaped potentiometer 3 may be designed to establish the logarithmic function of Equation 5 to provide a quantity commensurate with the logarithm of a function of altitude. Potentiometer 3 is shaped in accordance with the plot of Fig. 2. In addition to being used in the "Indicated Air Speed" computation, the voltage appearing at wiper 6 commensurate with a logarithmic function of altitude is applied to summing amplifier $U_3$ through summing resistor 11. The output voltage from summing amplifier $U_3$ is applied through a conventional magnetic amplifier 20 to servo motor 21 which drives Mach number shaft 23 in accordance with $\log_{10} f(h)$. Servo motor 21 also positions a wiper on follow-up potentiometer 13 which applies a follow-up voltage to the input of summing amplifier $U_3$ to zero out the input voltage. Generator 22 mounted on shaft 23 provides a velocity damping voltage at the input to summing amplifier $U_3$ through resistors 14 and 15. In order that shaft position 23 be representative of the $\log_{10} f(h)$, the follow-up potentiometer must be linear. Shaft 23 drives pinion 24 which, in turn, drives Mach number dial 25 mounted on a sector gear. Mach number dial 25 moves concentrically with the "Indicated Air Speed" dial 26 about the indicator needle shaft. Thus simulated indicated air speed may be read on scale 26 opposite a needle 27 and the simulated Mach number may be read on dial 25 opposite the same needle.

The logarithmic computation of the present invention lends itself to the simulation of the input to a combination "Indicated Air Speed" indicator and Mach number indicator, however, its teachings are not limited to that particular presentation. The present invention set forth herein has application to any simulation of "Indicated Air Speed" in flight simulators where the effects of compressibility are of importance.

Although the instant invention discloses the use of potentiometer means for generating the non-linear functions of Mach number and altitude which are summed to derive a function of indicated air speed, these non-linear functions might well be generated by other means, such as, for example, diode function generators. These are well-known to those skilled in the art as consisting of combinations of diode limiters and operational amplifiers, their design, operation and performance being discussed in "Electronic Analogue Computers" by Korn and Korn, second edition, McGraw-Hill Book Company, beginning on page 321.

Two such function generators are shown by way of example in Figs. 4 and 5 which are for $\log_{10} f(h)$ and $\log_{10}(M)$ respectively. The curves of $\log_{10} f(h)$ against $h$, and $\log_{10} f(M)$ against M are shown in Figs. 6 and 7 respectively, with an indication of how the curves are synthesized by the function generators. Referring to Fig. 6, the curve of $\log_{10} f(h)$ against $h$ is clearly seen as consisting of two straight lines, involving a simple change of slope. This has been generated by the simple expedient of changing the gain of the amplifier U-4 at the approximate input level by means of a single diode 41, which operates to change the amplifier gain by an effective change in the value of the feedback resistor. Amplifier U-4 receives its input voltage from a summing resistor 45 and has the usual feedback resistor 44 connected from its output to its input, while diode 41 is connected to the center point of a second feedback resistor comprising resistors 42 and 43. The curve of $\log_{10} f(M)$ is seen as shown in Fig. 7 to be approximated by a number of straight lines of varying slope drawn either secant or tangent to the desired curve. The curve of Fig. 7 may be generated by the means shown in Fig. 5. Diode limiters 51, 52, 53, 54 and 55 are shunted across the amplifier U-5 operate at various levels to change the gain of the amplifier according to the slopes of the various lines, each operating over a predetermined range, thereby generating the synthesized curve over the Mach number range. Amplifier U-5 has a conventional feedback resistor 59 and receives an input voltage commensurate with the Mach number of simulated flight through summing resistor 56. The output voltage from U-5 is shaped by the diode limiters as described above and may be applied to the input of an additional summing amplifier U-6 through summing resistor 72 in parallel with a fixed voltage which is applied thereto through summing resistor 73. The fixed voltage simulates the magnitude of the constant $e$. Amplifier U-6 has a conventional feedback resistor 74 and has an output commensurate with the desired function $\log_{10} f(M)$. Resistors 57, 58, 60, 64, 68, 61, 65, 69, 62, 66, 70, 63, 67 and 71 are connected with the diodes and a D.C. voltage supply as shown in order that the output voltage as shown in order that the output voltage of U-5 may vary according to the desired function. The diodes operate in cooperation with U-5 in a manner which is discussed in detail in the above identified textbook.

It is apparent that the functions could equally well have been generated by using cam-operated switches instead of the diodes shown, the cams being affixed to the Mach number and height servo shafts. Another alternative would be to generate these functions by using step-biased relays.

In summary, it should now be apparent that the present invention discloses a means of accurately and realistically simulating the "Indicated Air Speed" of a high speed aircraft without recourse to inaccurate generalizations and simplifications and which considers the effect of compressibility. It should also be apparent that the present invention discloses, but is not limited to, a means of simulating "Indicated Air Speed" which can be easily presented on a logarithmic scale as a part of a combined "Indicated Air Speed" and Mach number indicator.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A simulated combination indicated air speed and Mach number indicator system comprising means to provide a first quantity commensurate with a log of a function of a simulated Mach number, means to provide a second quantity commensurate with a log of a function of a simulated altitude, means to provide a resultant quantity commensurate with the sum of said first and second quantites, a stationary logarithmic indicated air speed scale, a movable indicator needle positioned with reference to said air speed scale in accordance with said resultant quantity to provide a measure of a simulated indicated air speed, a movable Mach number dial, and means responsive to said second quantity commensurate with a log of a function of a simulated altitude to position said Mach number dial.

2. A simulated air speed indicator system comprising in combination, a simulated Mach number servomechanism, potentiometer means connected to be adjusted mechanically by said Mach number servomechanism for providing a first potential commensurate with the log of a function of a simulated Mach number, a simulated altitude servomechanism, second potentiometer means connected to be adjusted mechanically by said altitude servomechanism for providing a second potential commensurate with the log of a function of a simulated altitude, means for summing said first and second potentials to provide a resultant potential commensurate with the log of a function of indicated air speed, a servo follow-up means responsive to said resultant potential and operable to position an indicator shaft in accordance therewith, an indicated air speed scale, and an indicator needle positioned by said servo follow-up means with reference to said air speed scale in response to said resultant potential to provide a measure of simulated indicated air speed, said servo follow-up means including a follow-up potentiometer shaped commensurate with the scale of calibration of said air speed scale.

3. A simulated air speed indicator system comprising in combination, a simulated Mach number servomechanism, potentiometer means connected to be positioned by said Mach number servomechanism for providing a first potential commensurate with the log of a function of a simulated Mach number, a simulated altitude servomechanism, second potentiometer means connected to be positioned by said altitude servomechanism for providing a second potential commensurate with the log of a function of a simulated altitude, means for summing said first and second potentials to provide a resultant potential commensurate with the log of a function of indicated air speed, a servo follow-up means responsive to said resultant potential to position an indicator shaft in accordance therewith, a logarithmic indicated airspeed scale, and an indicator needle positioned by said servo follow-up means with reference to said air speed scale in response to said resultant potential to provide an indication of simulated indicated air speed, said servo follow-up means including a linear follow-up potentiometer.

References Cited in the file of this patent

UNITED STATES PATENTS

| | | |
|---|---|---|
| 2,244,369 | Martin | June 3, 1941 |
| 2,618,973 | Peterson | Nov. 25, 1952 |
| 2,627,675 | Kittredge | Feb. 10, 1953 |
| 2,716,212 | Sims | Aug. 23, 1955 |
| 2,775,124 | Gardner et al. | Dec. 25, 1956 |
| 2,778,907 | Hamren | Jan. 22, 1957 |
| 2,784,501 | Stern et al. | Mar. 12, 1957 |
| 2,804,264 | Stern | Aug. 27, 1957 |
| 2,858,623 | Stern et al. | Nov. 4, 1958 |

OTHER REFERENCES

Korn and Korn: Electric Analog Computers; 1952; McGraw-Hill, N.Y., page 213.

Davis: 31 Ways To Multiply, Control Engineering, vol. 1, No. 3, November 1954, pages 36 to 46.